(12) United States Patent
Sanner et al.

(10) Patent No.: US 9,449,536 B1
(45) Date of Patent: Sep. 20, 2016

(54) HANDHELD REMOVABLE MESSAGE BOARD

(71) Applicants: Sarah Marie Sanner, Gilbert, AZ (US); Emily Jean Hughes, Arroyo Grande, CA (US); Jeremy Ryan Sanner, Gilbert, AZ (US); Rodney Steven Hughes, Arroyo Grande, CA (US)

(72) Inventors: Sarah Marie Sanner, Gilbert, AZ (US); Emily Jean Hughes, Arroyo Grande, CA (US); Jeremy Ryan Sanner, Gilbert, AZ (US); Rodney Steven Hughes, Arroyo Grande, CA (US)

( * ) Notice: Subject to any disclaimer, the term of this patent is extended or adjusted under 35 U.S.C. 154(b) by 0 days.

(21) Appl. No.: 14/697,386

(22) Filed: Apr. 27, 2015

Related U.S. Application Data

(60) Provisional application No. 61/996,061, filed on Apr. 28, 2014.

(51) Int. Cl.
  *G09F 7/18* (2006.01)
  *F16B 2/22* (2006.01)
  *F16M 13/02* (2006.01)
  *F16M 13/00* (2006.01)

(52) U.S. Cl.
  CPC . *G09F 7/18* (2013.01); *F16B 2/22* (2013.01); *F16M 13/005* (2013.01); *F16M 13/022* (2013.01)

(58) Field of Classification Search
  CPC ...... G09F 3/16; G09F 7/18; G09F 2023/005; F16B 2/241
  See application file for complete search history.

(56) References Cited

U.S. PATENT DOCUMENTS

| | | | | |
|---|---|---|---|---|
| 213,306 A | * | 3/1879 | Stieglitz | 40/652 |
| 616,951 A | * | 1/1899 | Mensch | 40/659 |
| 1,258,941 A | * | 3/1918 | Pease | 40/666 |
| 1,410,402 A | * | 3/1922 | Gray | 40/659 |
| 1,442,674 A | * | 1/1923 | Lee | 40/659 |
| 1,689,070 A | * | 10/1928 | Elliott | 40/666 |
| 1,708,055 A | * | 4/1929 | Dellmuth | 40/652 |
| 1,697,700 A | | 5/1929 | Tucker et al. | |
| 2,038,029 A | * | 4/1936 | Doebert | 40/666 |
| 2,049,855 A | * | 8/1936 | Meyer | 40/652 |
| 2,068,466 A | * | 1/1937 | Paul | 40/652 |
| 2,276,490 A | * | 3/1942 | Hoofer | 40/324 |
| 2,846,795 A | * | 8/1958 | Balaban | B42D 3/008 281/51 |
| 4,417,712 A | | 11/1983 | DeHart | |
| 5,167,086 A | | 12/1992 | Faust | |

* cited by examiner

*Primary Examiner* — Gary Hoge
(74) *Attorney, Agent, or Firm* — Booth Udall Fuller, PLC

(57) ABSTRACT

A removable message board can include an attachment piece including a message displayed on a front side and a back side opposite the front side. A coiled spring can include a first end that directly contacts the back side of the attachment piece and a second end opposite the first end that is wound along a length of the coiled spring to form a concentric circular shape configured to press against a chair back. A top surface of the coiled spring can be oriented towards a bottom surface of the coiled spring. The coiled spring can be disposed behind the attachment piece such that the coiled spring can be substantially covered by the attachment piece when viewed from a position perpendicular to a length and width of the attachment piece.

17 Claims, 9 Drawing Sheets

HANDHELD REMOVABLE MESSAGE BOARD

RELATED APPLICATIONS

This application claims the benefit of U.S. provisional patent application 61/996,061, filed Apr. 28, 2014 titled "My Chair Clip," the entirety of the disclosure of which is incorporated by this reference.

TECHNICAL FIELD

This disclosure relates to a handheld removable message board or a mountable temporary placard and method of using the same. The handheld removable message board or a mountable temporary placard can be employed in myriad applications, including for temporarily and removably coupling a message, such as a notice of reservation, to an object such as a chair, table, or other reserved item.

BACKGROUND

Conventional reservation signs and message displays generally comprise signs and sign holders. As discussed in greater detail below with respect to FIGS. 1A-1E, the sign holders have conventionally included a various number of features for use in reserving and identifying seats or other objects.

FIGS. 1A-1C show various views of a conventional visual presentation clip assembly 10 as disclosed in FIGS. 1 and 3 in U.S. Pat. No. 8,250,791 (hereinafter the "'791 patent"). The '791 patent discloses the visual presentation clip assembly 10 comprises a clip 12 and a visual presentation area 14 that may be attached to a food or drink container 20 to indicate that a consumer who has temporarily left their seating or standing location, or food or drink container 20 unattended, will return thereby avoiding the loss of a seating or standing location, or the disposal of unconsumed food or drink. The clip assembly 10 has a clip head 16 with a front and rear face for displaying visual information such as text, an image, a logo, a trade name, an emblem, etc. The clip head 16 is attached to an elongated body 18 depending therefrom. An elongated back leg 19 extends from the back of the clip 103 behind the body. The clip 103 is attached to the container 20 by sliding the wall 22 of the container having an exposed edge 24 between the elongated body 18 and the elongated leg 19. The elongated body 18 and the elongated leg 19 are scissor-like, are substantially straight and parallel to a direction of the surfaces along which they extend, and are formed of a flexible material so as to hold the wall 22 of the container 20 between the elongated body 18 and the elongated leg 19.

FIG. 1D shows a side profile view of a conventional sign carrier 30 that is similar to the sign carrier presented in FIG. 1 of U.S. Pat. No. 2,172,787 (hereinafter the "'787 patent"). The '787 patent discloses the conventional sign carrier 30 can comprise a main body 32 formed of a length of wire-like element. The wire-like element can comprise a first end formed as a shelf-engaging clamp 34 and a second end opposite the first end formed as a sign-engaging clamp 36. The shelf-engaging clamp 34 and the sign-engaging clap 36 are formed by crossing the main body 32 or the wire-like element over itself to form flat elements so that compression between an upper crossed portion and a lower crossed portion of the wire-like element can hold a shelf or sign, respectively.

FIG. 1C shows a perspective side view of a conventional reserved sign 40, available from "Leaflet Missal," a catholic Ministry, available at http://www.leafletonline.com/RE-SERVEDSIGN/productinfo/15384/. The reserved sign 40 of FIG. 1C comprises an engraved laminate sign 42 with swivel mount 44 and a heavy-duty spring clamp 46, which can be secured to a chair or other surface for reserving seating or a room for guests or for special occasions.

SUMMARY

A need exists for a removable message board. Accordingly, in an aspect, a removable message board can comprise an attachment piece comprising a front side and a back side opposite the front side. The message board can comprise a message displayed on the front side of the attachment piece, and a coiled spring comprising a first end that directly contacts the back side of the attachment piece and a second end opposite the first end that is wound along a length of the coiled spring to form a concentric circular shape configured to press against a chair back. The coiled spring can be disposed behind the attachment piece such that the coiled spring is substantially covered by the attachment piece when viewed from a position perpendicular to a length and width of the attachment piece.

The removable message board can further comprise a first end of the coiled spring being held in place against the attachment piece by a raised lip that contacts at least two edges of the coiled spring. The coiled spring can be substantially covered by the attachment piece when 50% or more of the coiled spring is covered by the attachment piece when viewed from the position perpendicular to the length and width of the attachment piece. A plane comprising a circular cross-section of the coiled spring can be perpendicular to a length and a height of the attachment piece. A length of the coiled spring from the second end to the first end can be coiled inwardly toward the attachment piece in concentric circles such that a top surface of the coiled spring is oriented towards a bottom surface of the coiled spring that is formed opposite the top surface. The coiled spring can be configured to place an object disposed between the attachment piece and the coiled spring in compression without the use of a scissor clamp, and without the length of the coiled spring comprising a crossed portion along its length.

A method of using the removable message board can comprise moving a portion of the coiled spring away from the attachment piece while the first end of the coiled spring remains in contact with the back side of the of the attachment piece to create a gap between the portion of the coiled spring comprising the second end of the coiled spring and the attachment piece. The method can further comprise disposing an object within the gap between the attachment piece and the portion of the coiled spring. The method can further comprise releasing the coiled spring so that the coiled spring moves towards the attachment piece to decrease a size of the gap such that the portion of the coiled spring contacts the object to removably couple the removable message board to the object.

In another aspect, a removable message board can comprise an attachment piece comprising a front side and a back side opposite the front side. A message can be coupled to the attachment piece. A coiled spring can comprise a first end coupled to the back side of the attachment piece and a second end opposite the first end that is wound along a length of the coiled spring to form a circular shape. The coiled spring can be disposed behind the attachment piece such that the coiled spring can be substantially covered by the attachment piece when viewed from a position perpendicular to a length and width of the attachment piece.

The removable message board can further comprise a first end of the coiled spring being held in place against the attachment piece by a raised lip. The coiled spring can be substantially covered by the attachment piece when 50% or more of the coiled spring is covered by the attachment piece when viewed from the position perpendicular to the length and width of the attachment piece. A length of the coiled spring from the second end to the first end can be coiled inwardly toward the attachment piece in concentric circles such that a top surface of the coiled spring is oriented towards a bottom surface of the coiled spring that is formed opposite the top surface. The coiled spring can be configured to place an object disposed between the attachment piece and the coiled spring in compression without the use of a scissor clamp, and without the length of the coiled spring comprising a crossed portion along its length. The message can be disposed on a placard that is coupled to, and spaced away from, the attachment piece by a connecting member.

In another aspect, a removable message board can comprise an attachment piece comprising a front side and a back side opposite the front side. A message can be coupled to the attachment piece. A coiled spring can comprise a first end coupled to the back side of the attachment piece and a second end opposite the first end that is wound along a length of the coiled spring to form a concentric circular shape.

The removable message board can further comprise a first end of the coiled spring being held in place against the attachment piece by a raised lip that contacts at least two edges of the coiled spring. The coiled spring can be disposed behind the attachment piece such that the coiled spring is substantially covered by the attachment piece when viewed from a position perpendicular to a length and width of the attachment piece, and wherein the coiled spring is substantially covered by the attachment piece when 50% or more of the coiled spring is covered by the attachment piece. A plane comprising a circular cross-section of concentric portions of the coiled spring can be perpendicular to a length and a height of the attachment piece. A length of the coiled spring from the second end to the first end can be coiled inwardly toward the attachment piece such that a top surface of the coiled spring is oriented towards a bottom surface of the coiled spring that is formed opposite the top surface. The coiled spring can be configured to place an object disposed between the attachment piece and the coiled spring in compression without the use of a scissor clamp, and without the length of the coiled spring comprising a crossed portion along its length. The message can be disposed on a placard that is coupled to, and spaced away from, the attachment piece by a connecting member.

DETAILED DESCRIPTION

Figure 1A:
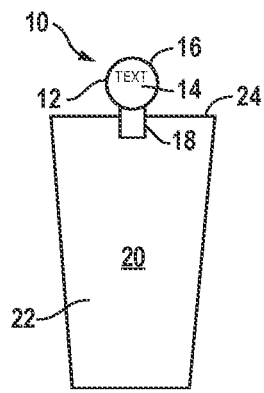
FIGS. 1A-1E show various views of reservation signs and message displays as known in the prior art.
Figure 1B:
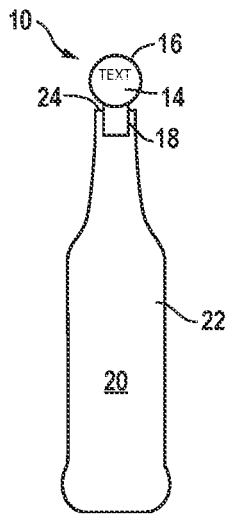
Figure 1C:
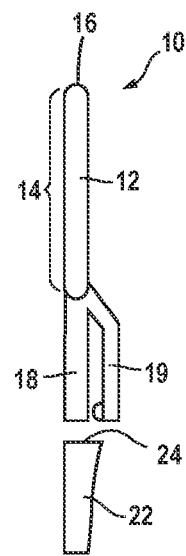
Figure 1D:
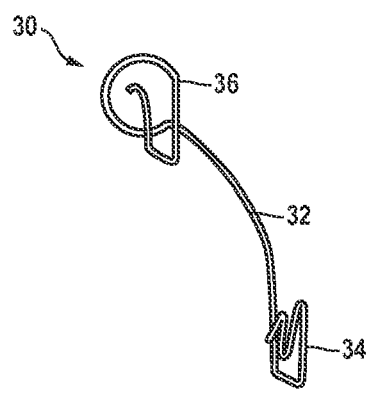
Figure 1E:
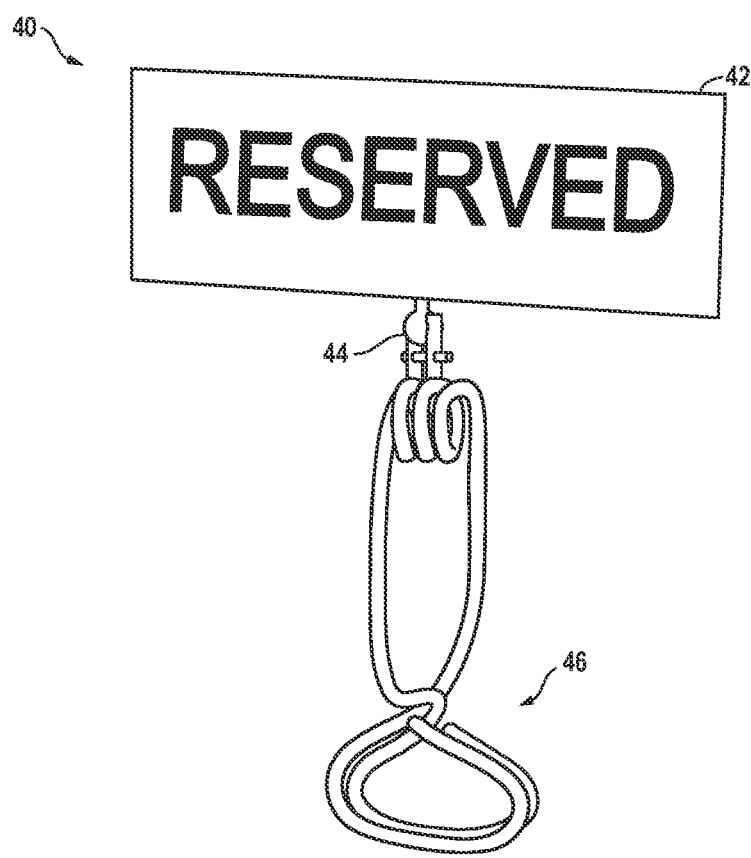

This disclosure, its aspects and implementations, are not limited to the specific handheld removable message boards, material types, or other system component examples, or methods disclosed herein. Many additional components, manufacturing and assembly procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity and because one of ordinary skill in the art will understand the breadth of various other alternate examples from the disclosure and alternative examples provided herein.

While this disclosure includes a number of embodiments in many different forms, there is shown in the drawings and will herein be described in detail, particular embodiments with the understanding that the present disclosure is to be considered as an exemplification of the principles of the disclosed methods and systems, and is not intended to limit the broad aspect of the disclosed concepts to the embodiments illustrated.

Figure 2A:
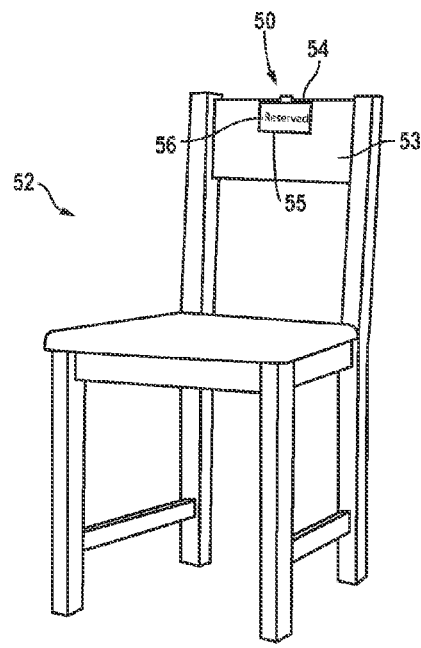
FIGS. 2A-2J show various views of embodiments of a removable message board.

This disclosure describes a removable message board 50 and provides a system and method for using the removable message board 50. FIG. 2A shows a perspective view of the removable message board or mountable temporary placard 50 that is releasably coupled to a chair 52. A message 56 can be displayed on, or by, the message board 50. FIG. 2A shows a non-limiting example in which the message 56 can comprise the text "Reserved" that would indicate to an observer that the chair 52 is reserved and not to be used except for the party or person for which the chair 52 has been reserved. While FIG. 2A shows a non-limiting example of the chair 52 being formed as a four-legged chair, the chair 52 can also comprise any number of legs, such as 1, 2, 3, 4, or 5 legs, and one or more of the legs can be formed as a column, pedestal, recliner, rocker, slider, skid, or other suitable structure. In some instances, the chair 52 can be a stand-alone unit. Alternatively, the chair 52 can be part of a row of chairs, such as a row of seating or group of chairs 52 found at a movie theater, an auditorium, a gymnasium, a stadium, or another venue. The chair 52 can also refer to a pew, bleacher, riser, or other place for seating. In other instances, the chair 52 can further refer to a table, booth, box, counter, window, ticket area, concession area, or any other place or locale that could benefit from displaying a message 56.

The message 56 can be any collection of text, writing, numbers, symbols, or colors, including names, directions, and instructions, that communicate a message to a group, individual, or the general public. The message 56 can be fixed, such as written, inscribed, or engraved message. Alternatively, the message 56 can be a variable message, such that the removable message board 50 allows for substitution or exchanging of various fixed messages. On the other hand, a variable message 56 can be accommodated by an electronic message that is part of a variable message display board including lights, a screen, a liquid crystal display (LCD), or any other suitable display for communicating one or more messages. Thus, the message 56 can be programmed or activated so as to provide different desired messages at desired times. For electronic messages 56, an entire message 56 can be communicated on the message board 50 in a single moment or at a single time. Conversely, a running or scrolling message 56 can be displayed in which an entirety of the message 56 is not displayed in a single moment or at a single time, and instead is displayed over an interval of time, such as for a period of a few seconds or minutes. Such a repeating electronic message 56 can be looped or repeated for continuous replay for any desired amount of time.

As a non-limiting example, the message 56 can include a standardized message such as "reserved," "closed," "use next window," "stop," "move ahead," or any other desired message. The message 56 can also include an individualized or particularized message 56 that can include the name of a party or individual for whom the message 56 is intended, such as "Reserved for Mary." Whatever the content of message 56, or the method of conveyance, the message 56 can be removably and temporarily displayed on any suitable structure, such as on the chair 52, by using the message board 50.

The message board 50 can be disposed at a top of the chair back 53, as shown in FIG. 2A, such that a top side 54 of the message board 50 can be aligned with, or be near, a top of the chair back 53. The message board 50 can additionally comprise a bottom side 55 that is disposed opposite the top side 54, and can be offset, or disposed away from, the top of the chair back 53 and away from a bottom of the chair back 53, so that the bottom side 55 is disposed in a central area, or near a center of the chair back 53. However, while the terms "top" and "bottom" as used herein for convenience of description with respect to the top side 54 and the bottom side 55 of the message board 50, the terms "top" and "bottom" are used as non-limiting, illustrative terms. Furthermore, for ease of explanation, the terms top and bottom can correspond to a height, which can be included in a y-direction. Similarly, a width can correspond to an x-direction, and a thickness or depth can corresponds to a z-direction. Additionally, the x-direction, y-direction, and z-direction can all be perpendicular or orthogonal to each other.

Thus, the orientation of the top side 54 and the bottom side 55 could be reversed with respect to the message 56, or the chair 52, with respect to what has been shown in FIG. 2A. In some instances, for example, instead of coupling the message board 50 to the top of the chair back 53, the message board 50 could be coupled to a side or bottom portion of the chair back 53, or of the chair 50, and the message 56 displayed by the message board 50 could be aligned at any suitable orientation for viewing by a person, patron, or by the public. Similarly, the orientation of the message board 50 could also be rotated by 90 degrees, or any other number of degrees, so that the top side 54 and bottom side 55 of the message board 50 could become the sides of the message board 50. In yet other instances, the message board 50 can be disposed at a bottom of the chair back 53, such that a bottom side 55 of the message board 50 can be aligned with, or be near, a bottom of the chair back 53.

Figure 2B:
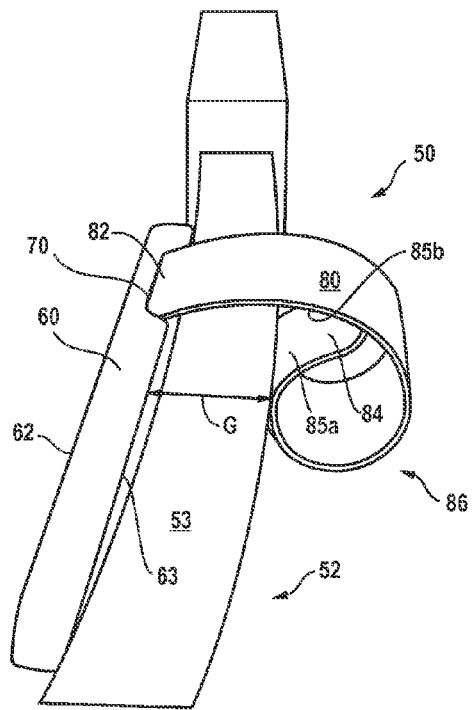

FIG. 2B shows a close-up perspective view of the message board 50 being coupled to the chair back 53 of the chair 52, similar to what was shown in FIG. 2A. FIG. 2B provides additional detail of the message board 50 by showing an attachment piece or sign placard 60 and a coiled spring 80, each of which is discussed in greater detail below. The attachment piece 60 can comprise a front side 62 and a back side 63 that is opposite the front side 62. In some embodiments, the front side 62 can correspond to the position of the message 56 of the message board 50, although the message 56 could also be disposed at other locations as well. The terms "front" and "back" as used herein with respect to the front side 62 and the back side 63, are relative non-limiting terms that are used for convenience, and could be alternately arranged. Thus, the orientation of the front side 62 and the back side 63 could be reversed with respect to the message board 50, the message 56, or both.

The attachment piece 60 can also comprise a top side 64 and a bottom side 65 that is opposite the top side 64. The top side 64 and the bottom side 65 can correspond to the top side 54 and the bottom side 55, respectively, although they need not do so. The terms "top" and "bottom" as used herein with respect to the top side 64 and the bottom side 65, like with the top side 54 and the bottom side 55, are relative non-limiting terms that are used for convenience. Thus, the orientation of the top side 64 and the bottom side 65 could be reversed with respect to the message 56.

As shown in FIG. 2B, when both the attachment piece 60 and the coiled spring 80 are coupled together, the attachment piece 60 and the coiled spring 80 can form a gap G, such that the message board 50 can be coupled to the chair back 53 by disposing at least a portion of the chair back 53 within the gap G. Stated another way, the message board 50 and the gap G can be placed over the chair back 53 to releasably and temporarily couple the message board 50 to the chair 52. As indicated above, chair 52 is a non-limiting term that can comprise tables, benches, or other structures comprising edges or other attachment portions that can be disposed within the gap G. Thus, the message board 50 can be attached to a variety of different devices to present or display a variety of messages 56 due to the flexible and adjustable nature of the gap G.

The adjustable nature of the gap G can allow for the coiled spring 80 and the attachment piece 60 to place an object, such as the chair 52, in compression between the attachment piece 60 and the coiled spring 80. Compression of an object within the gap G can be achieved by coupling a first end 82 of the coiled spring 80 to the attachment piece 60. A second end 84 of the coiled spring 80 can be disposed opposite of the first end 82, the second end 84 being coiled along a length Ls of the coiled spring 80 towards the first end 82 to form a coiled portion 86 of the coiled spring 80. As such, a method of using the message board 50 can comprise moving the coiled portion 86 of the coiled spring 80 away from the attachment piece 60 while the first end 82 of the coiled spring 80 remains coupled to, or in contact with, the back side 63 of the attachment piece 60 to create the gap G between the coiled portion 86 of the coiled spring 80, including the second end 84, and the attachment piece 60. The method of using the message board 50 can further comprise disposing an object, such as a portion of the chair 52, within the gap G between the attachment piece 60 and the coiled portion 86 of the coiled spring 80. The method of using the message board 50 can additionally comprise releasing the coiled portion 86 of the coiled spring 80 so that the coiled portion 86 moves towards the attachment piece 60 and the first end 82 to decrease a size of the gap G such that the coiled portion 86 of the coiled spring 80 contacts the chair 52, to removably couple the message board 50 to the chair 52.

By using the coiled spring 80 and the attachment piece 60 to place a portion of the chair 52 in compression within the gap G, the message board 50 can be releasably coupled to the chair 52 without a scissor clamp comprising a coiled spring, without a scissor clamp not comprising a coiled spring, and without a wire-like element or main body 32 that is bent or angled to cross over itself, as shown, for example, in FIGS. 1A-1E. Additionally, in some embodiments, the message board 50 can be arranged so that the coil spring 80 can be coupled to the message board 50 in such a way so as to facilitate tightening or loosening of the coil spring 80, or to change a relative position between the attachment piece 60 and the coiled spring 80, so as to adjust, change, or customize a force applied by the coiled spring 80 to the chair 52. The message board 50 can also be arranged so that a range of sizes for the gap G, and an accompanying force or amount of compressive force applied by the message board 50 for a given size of the gap G, can be adjusted and vary according to the configuration or design of the chair 52 to which the message board 50 will be coupled. Thus, varying a size of the gap G can be easier or harder for a user, requiring less force or more force to adjust a size of the gap G, based on a configuration, design, or particular application of the message board 50.

FIG. 2B further shows that an opening, notch, or slot 70 can be formed in, or as part of, the attachment piece 60 to allow for a portion of the coiled spring 80, such as the first end 82 of the coiled spring 80, to be inserted within the opening 70 when coupling the coiled spring 80 to the attachment piece 60.

Figure 2C:
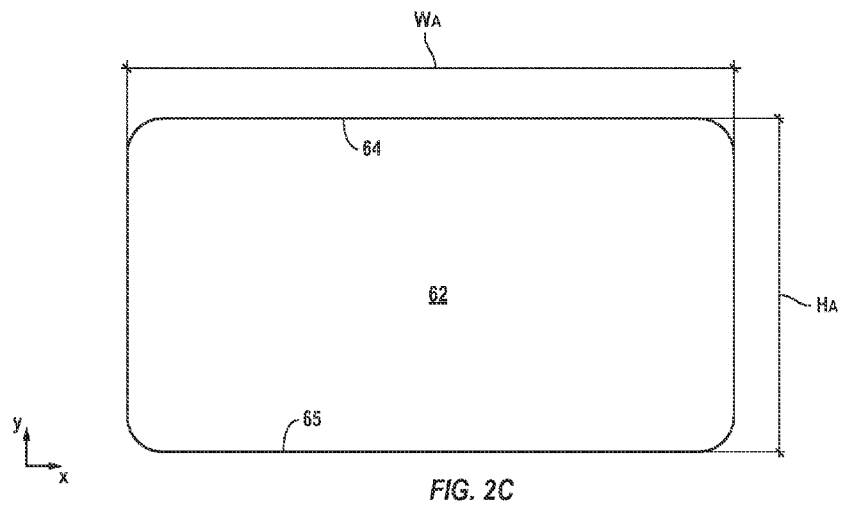

FIG. 2C shows a plan view of the front side 62 of the attachment piece 60 without the coiled spring 80 being attached to the attachment piece 60. The attachment piece 60 can comprise a rigid or semi-rigid structure comprising a front side 62, a top side 64, and a bottom side 65 opposite the top side 64. The attachment piece 60 can comprise any suitable material, or combination of materials, including metal, plastic, resin, polymer, acrylic, ceramic, stone, fiber, or cellulose material such as paper, cardboard or wood. As such, the attachment piece 60 can comprise, without limitation, polycarbonate (PC), polyethylene (PE), polyethylene terephthalate (PET), polyvinyl chloride (PVC), vinyl nitrile (VN), or other suitable material.

FIG. 2C shows a non-limiting example of the attachment piece 60 formed comprising a rectangular shape with rounded corners. However, the attachment piece 60 may or may not be rectangular in shape, and can comprise any suitable shape or form, including but limited to heart, circle, diamond, star, square, oval, or other geometric or organic shapes or forms. Additionally, the shape or form of the attachment piece 60 can be formed as a silhouette of an object, such as an animal, fruit, monument, company logo, letter, number, symbol, mascot, or any other desirable form.

As shown in FIG. 2C, the attachment piece 60 can comprise a height Ha, and a width Wa. In some instances, the height Ha can be in a range of about 2.5-12.7 centimeters (cm) (or 1-5 inches (in.)), 5.1-10.2 cm (or 2-4 in.), or about 6.4 cm (or 2.5 in.), wherein about, as used herein, can be equal to plus or minus 2.5 cm (or 1 in.) or less. In some instances, the attachment piece 60 can comprise a width Wa that can be in a range of about 7.6-25 cm (or 3-10 in.), 7.6-15.2 cm (or 3-6 in.), or about 8.9-12.7 cm (or 3.5-5 in.), wherein about, as used herein, can be equal to plus or minus 2.5 cm (or 1 in.) or less. Thus, an area of the front side 62 of the attachment piece 60 can be in a range of about 19 $cm^2$ to 317.5 $cm^2$ (or 2.9 $in.^2$ to 50 $in.^2$).

The front side 62 of attachment piece 60 can comprise a flat, planar surface, and can further comprise the message 56, in any of its desired forms or embodiments. Alternatively, a separate message area, such as message board 99 shown in FIG. 2J, can be coupled to, and extend away from, the attachment piece 60. In some embodiments, the front side 62 of attachment piece 60 can, in addition to comprising the message 56, further comprise a decorated surface comprising one or more of a color, pattern, or design element to uniquely identify the message board 50 from a plurality of other message boards 50, each of which may comprise an identical message 56. For example, a number message boards 50 disposed on adjacent chairs 52 could each comprise an identical message 56, such as "Reserved." Each of the message boards 50, or group of message boards 50 belonging to a single group or party, could comprise one or more unique distinguishing decorated surfaces to assist an individual or party to distinguish or identify their reserved chairs 52 from the reserved chairs of others. The one or more decorated surfaces of the message boards 50 can be integrally formed with the message boards, as well as a discrete, modular, or changeable feature to the message boards, that can be changed at desired intervals of time.

Figure 2D:
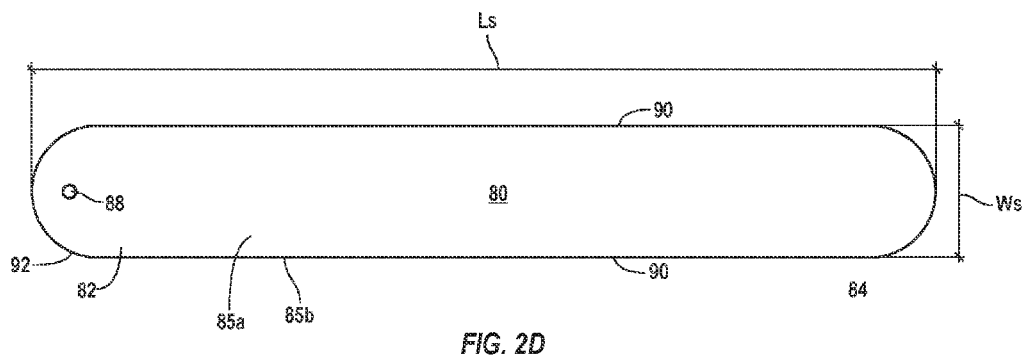

FIG. 2D shows a plan view of the coiled spring 80 in a first position or arrangement that is uncoiled, with the coiled spring 80 being flat and planar along an entire length Ls and along an entire width Ws of the coiled spring 80. Additionally, in some embodiments, with the coiled spring 80 can be flat and planar along an entire length Ls and comprise a curve or raised side edges 90 with respect to a center portion of the coiled spring 80 disposed between the two raised side edges 90. Alternatively, the coiled spring 80 can be formed so as to be permanently or constantly in a second position or arrangement that is coiled, wound, or spiral shaped. Furthermore, the coiled spring 80 can be formed so as to changeably vary between the first and second positions. As such, the coiled spring 80 can be made of any suitable material that can lay flat, but can also be able to bend, coil, or curve while also being able hold or maintain a desired shape and provide sufficient compressive force to couple the message board 50 to the chair 52.

The side edges 90 can be connected by one or more end edges 92 that are formed at the first end 82 and the second end 84 of the coiled spring 80. The end edges 92 can comprise a rounded or curved shape, as illustrated in the non-limiting example presented n FIG. 2D. Additionally, the end edges 92 can comprise a straight, flat, squared, wavy, undulating, or any other shape. The coiled spring 80 can also comprise a top surface 85a and a bottom surface 85b that is formed opposite the top surface 85a, and is oriented away from the top surface 85a.

The coiled spring 80 can comprise a semi-rigid, flexible, bendable, pliable, or resilient structure that can be made of one or more materials that are the same, similar, or different than the materials of the attachment piece 60. The coiled spring 80 can comprise any suitable material or combination of materials, including metal, plastic, resin, polymer, acrylic, ceramic, stone, fiber, or cellulose material such as paper, cardboard or wood. As such, the coiled spring 80 can comprise, without limitation, silicone, PC, PE, PET, PVC, VN, or other suitable material.

In some embodiments, the length Ls of the coiled spring 80 can be greater than a width Wa of the attachment piece 60. In other embodiments, the length Ls of the coiled spring 80 can also be equal to or less than the width Wa of the attachment piece 60, and can also be greater than the height Ha of the attachment piece 60. As a non-limiting example, the length Ls of the coiled spring 80 can be in a range of about 15-46 cm (or 6-18 in.), or 20-31 cm (or 8-12 in.), or 20-28 cm (or 8-11 in.), wherein "about" as used herein is equal to plus or minus 2.5 cm (or 1 in.). Similarly, as a non-limiting example, the width Ws of the coiled spring 80 can be in a range of about 0.64-6.4 cm (or 0.25-2.5 in.), or 1.3-3.8 cm (or 0.5-1.5 in.).

Figure 2E:
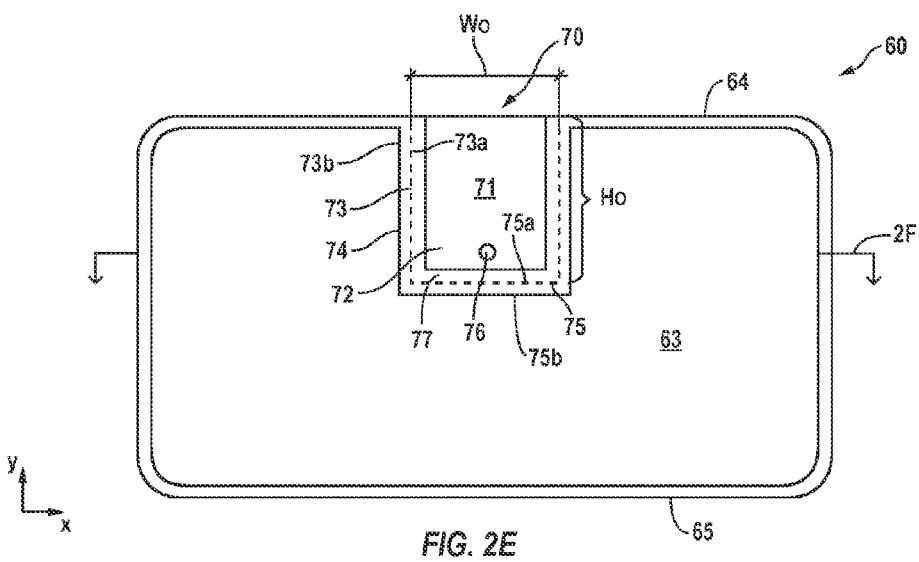

As shown in FIG. 2D, the coiled spring 80 can comprise a connecting member 88 that can be formed as divot, bump, or hole at the first end 82 that can contact or be mateably coupled with a corresponding connecting member 74 at the back side 63 of the attachment piece 60, as shown in FIG. 2E, to help couple, connect, or hold the coiled spring 80 together with the attachment piece 60. In addition to connecting members 74 and 88, the attachment piece 60 and the coiled spring 80 can also be releasably or permanently coupled to each other using any suitable chemical or mechanical fastener or attachment device or substance including without limitation, an adhesive, permanent adhesive, pressure sensitive adhesive (PSA), foam-core adhesive, tape, two-sided tape, mounting foam adhesive, fastener, clip, cleat, cutout, tab, snap, rivet, hog ring, or hook and loop fasteners.

As indicated above, one or more surfaces of the message boards 50, such as the coiled spring 80, can comprise unique distinguishing decorated surfaces to assist an individual or party to distinguish or identify their reserved chairs 52 from the reserved chairs of others. The one or more decorated surfaces of the coiled spring 80 can be the same, similar, or different than the decorated surfaces of the attachment piece 60.

FIG. 2E shows a plan view in the x-y plane of the back side 63 of the attachment piece 60, which is opposite the front side 62 shown in in FIG. 2C. The back side 63 of the attachment piece 60 piece can comprise a rectangular shape, outline, or footprint, with rounded corners, as shown in FIG. 2E. Alternatively, the shape, outline, or footprint of the attachment piece 60 can comprise can comprise any suitable shape or design, as described above. The back side 63 can further comprise the opening 70 that is sized, formed, and configured, to be coupled to the coiled spring 80.

The opening 70 can be defined by a raised lip or flange 74 that can mateably couple with a portion of the coiled spring 80, such as with a first end 82 of the coiled spring. The lip 74 can contact one, two, three, or more sides of the coiled spring 80. The lip 74 can comprise side portions 73 and of a bottom portion 75 that connects the side portions 73 at squared corners, rounded corners, or is continuously sloped to transition from a bottom portion 75 to side portions 73. The side portion 73 can comprise an inner or interior surface 73a situated adjacent or oriented towards an inner area 71 of the opening 70 for receiving the coiled spring 80. Similarly, the bottom portion 75 can comprise an inner or interior surface 75a situated adjacent or oriented towards the inner area 71 of the opening 70 for receiving the coiled spring 80. The side portion 73 can also comprise an outer or exterior surface 73b opposite the inner surface 73a offset or oriented away from the inner area 71. Similarly, the bottom portion 75 can also comprise an outer or exterior surface 75b offset or oriented away from the inner area 71. In some instances, a size, shape, or both, of the inner surfaces 73a and 75a can mateably match a size, shape, or both, of side edges 90 and of end edge 92, respectively, of the coiled spring 80. Thus, while the inner surface 75a is shown as being straight or squared, and end edge 92 is shown as being curved or rounded, the inner surface 75a and the end edge 92 can comprise shapes that are the same or different. The raised lip 74 can directly contact, or be integrally formed with, any suitable portion of the message board 50, such as the back side 63 of the attachment piece 60.

As a non-limiting example, a shape of the opening 70 is shown comprising a rectangular shape. However, opening 70 and the lip 74 may or may not be rectangular in shape, and can comprise any suitable shape or form, including but limited to heart, circle, diamond, star, square, oval, or other geometric or organic shapes or forms. A size of the opening 70 can be defined by portions of the lip 74, such as by inner surface 73 and by inner surface 75a. A position of the opening 70 can be along the top side 64, the bottom side 65, or any side of the attachment piece 60, including centered or offset along a length of any of the sides of the attachment piece 60. The width Wo, height Ho, and depth Do of the opening 70 can be of any suitable dimension for matching or mating with one or more dimensions of the spring 80, and for coupling the spring 80 and the attachment piece 80 to any chair 52 on which the message 56 will be displayed.

In some embodiments, a width Wo of the opening 70 can be measured or defined as the space or offset between two opposing inner surfaces 73a of the side portions 73. The width Wo of the opening 70 and the inner area 71 can be substantially equal to, or slightly larger than, the width Ws, wherein substantially includes a dimension of plus or minus 0-3 millimeters (mm). As non-limiting examples, the width Wo of the opening 70 can be in a range of about 1.3-3.8 cm (or 0.5-1.5 in.). The height Ho of the opening 70 can be 2.5-5 cm (or 1-2 in.). The thickness To, or depth, of the opening 70 can be in a range of 0.16-0.32 cm (or 1/16-1/8 in.).

As further shown in FIG. 2E, the opening 70 or the attachment piece 60 can be formed comprising a connecting member 76 that can be formed as raised or depressed divot, bump, opening, ridge, slot, or other suitable structure on the back side 63 to be mateably coupled to the connecting member 88 to hold or couple the coiled spring 80 to the attachment piece 60. In some instance connecting member 76 will be an opposite, mirror image, or conjugate shape of the connecting member 88 so that the connecting members 76 and 88 can be mateably coupled to each other. As such, the coiled spring 80 can slide into the opening 70 to contact the back side 63 of attachment piece 60, and can further be secured in place with the connecting member 88 and the connecting member 76 being interlocked, permanently coupled, or releasably coupled to each other.

Figure 2F:
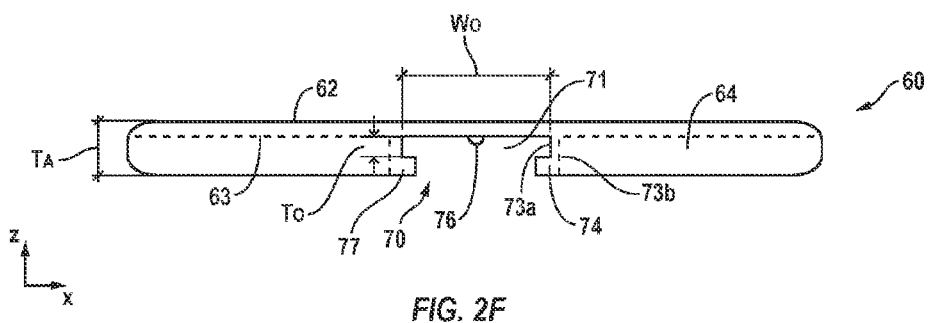

While FIGS. 2D-2F show one matching pair of connecting members 76 and 88, there can also be more than one matching pair of connecting members. Additionally, there can also be different numbers of connecting members 76 and connecting members 88, so that a relative position or positioning of the spring 80 and the attachment piece 60 can be varied according to various relative positions of the connecting members 76 and 88. The various relative positions of the connecting members 76 and 88 can be varied according to the particular applications of the message board 50 to change a size of the gap G formed between the coiled portion 86 of the spring 80 and the attachment piece 60. Similarly, the various relative positions of the connecting members 76 and 88 can be varied to change the amount of force required for maintaining the gap G at a fixed or desired size.

FIG. 2E further shows that the lip 74 can further comprise an overhang or retaining portion 77 that can be disposed within the opening 70 on the back side 63 to enclose at least of apportion of the inner area 71 to form the attachment area 72 for coupling the spring 80 to the attachment piece 60. The spring 80 can be retained within the opening 70 by comprising a width Ws that is greater than a distance, space, or gap that is formed between the overhang portions 77, so that at least some of the overhang portion 77 is in contact with, and holding in place, the spring 80 within the opening 70. In some embodiments, the overhang 77 can extend from opposing side portions 73 of the lip 74 to completely cover inner area 71, such that the inner area is an enclosed space or hollow formed within the attachment piece 60. In other embodiments, the opening 70 or attachment area 72 need not be defined by the overhang 77, and the opening 70 or the attachment area 72 can be less conducive to removably attaching the spring 80 to the attachment piece 60. For example, instead of being defined by the overhang 77, the inner area 71 or the attachment area 72 can be formed by a tape or adhesive that couples the spring 80 to the attachment piece 60.

FIG. 2F shows a plan view of the top side 64 of the attachment piece 60 in the x-z plane, taken along the section line 2F shown in FIG. 2E. In some instances, the attachment piece 60 can comprise a thickness Ta that can be in a range of about 0.16-2.54 cm (or 1/16-1 in.), or about 0.95-1.43 cm (or 6/16-9/16 in.). In some instances, the opening 70 can comprise a thickness To that is less than the thickness Ta of the attachment piece 60, and can be in a range of about 0.079-1.27 cm (or 1/32-1/2 in.), or about 0.16-1.48 cm (or 1/16-3/16 in.).

Figure 2G:
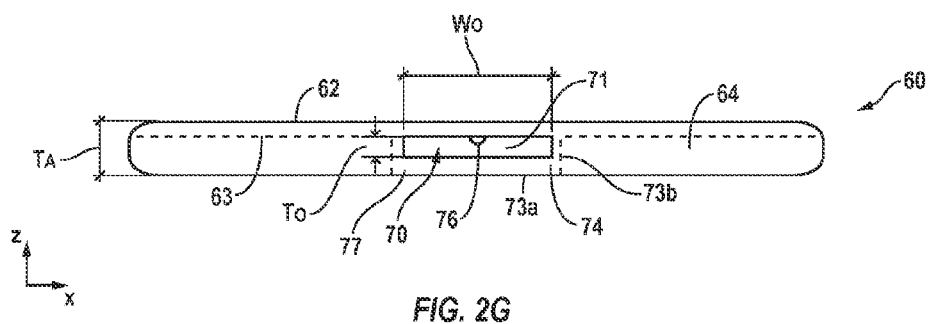

FIG. 2G shows a plan view of the top side 64 of the attachment piece 60 in the x-z plane, similar to the view shown in FIG. 2F. FIG. 2G differs from FIG. 2F in that the overhang or retaining portion 77 is shown extending between opposing raised lips 74 to completely cover the opening 70, when viewed in the x-y plane. The retaining portion 77 can cover any desirable amount of opening 70, whether an entirety or a less than entirety of the opening 70, according to the configuration and design of the message board 50. An amount of coverage provided by the retaining portion, can be adjusted by the size of the overhang 77, as well as by inclusion of cutouts, vents, or openings, within the overhang 77. The size and configuration of the overhang 77 can vary according to a desirable amount of support for retaining the coiled spring 80 within the opening 70, or for forming the attachment piece 60 by molding or other suitable process.

Figure 2H:
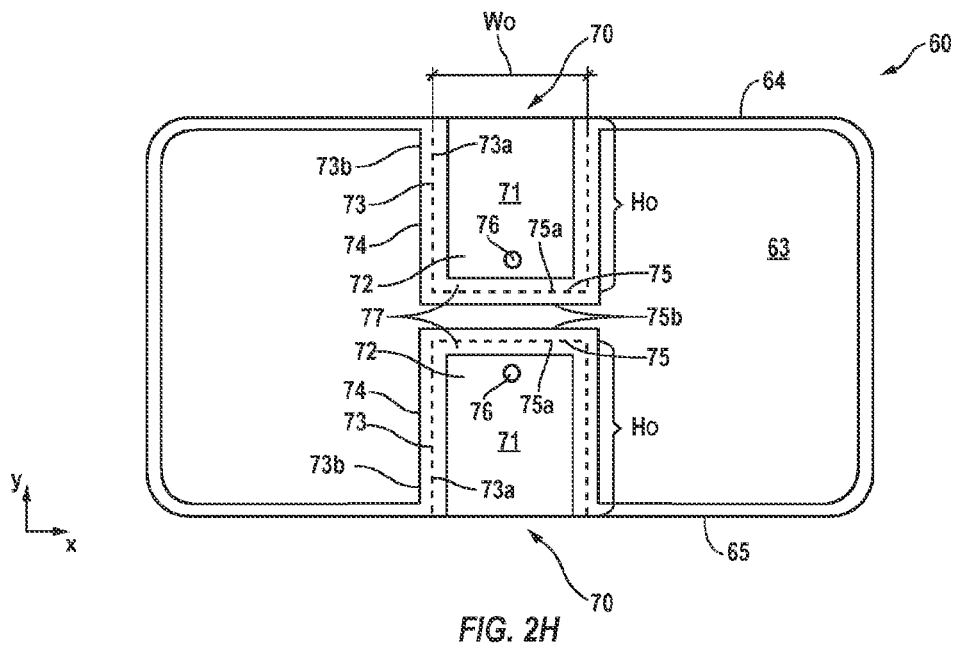

FIG. 2H shows another plan view in the x-y plane of the back side 63 of the attachment piece 60, similar to the view shown in FIG. 2E. The attachment piece 60 shown in FIG. 2H differs from the attachment piece 60 shown in FIG. 2E by inclusion of more than one opening 70 formed on the back side 63. The multiple openings 70 can be formed with gaps between them, without gaps in a touching configuration, or without a gap in a connected configuration in which a single coiled spring 80 can be inserted into the opening 70 from one or more directions or angles. Forming a plurality of openings 70 with the attachment piece 60 can allow a user discretion in how the coiled spring 80 is coupled to the attachment piece 60, and how the message board 50 is coupled to the chair 52. In coupling the coiled spring 80 to the attachment piece 60, one or more coiled springs 80, of or one or more sizes, can be inserted within one or more of the openings 70 to accommodate different sizes and orientations of coiled springs 80 to provide flexibility in attaching the message board 50 to a chair 52. Thus, the plurality of openings 70 can comprise 2, 3, 4, 5, or any number of openings 70. Additionally, the plurality of openings 70 can be disposed at one or more locations along the top side 64, the bottom side 65, at other sides intermediately disposed between the top side 64 and the bottom side 65 in which one or more of the plurality of openings 70 can be aligned, offset, or both aligned and offset with respect to each other. In some instances special tabs or receiving devices can also be included as part of the message board 50 to hold or store the one or more coiled springs 80, in a coiled or uncoiled position, including in a flat laminar orientation with a portion of the message board 50, such as the attachment piece 60, to accommodate compact storage and prevent separation of the coiled spring from the attachment piece 60 during storage.

Figure 2I:
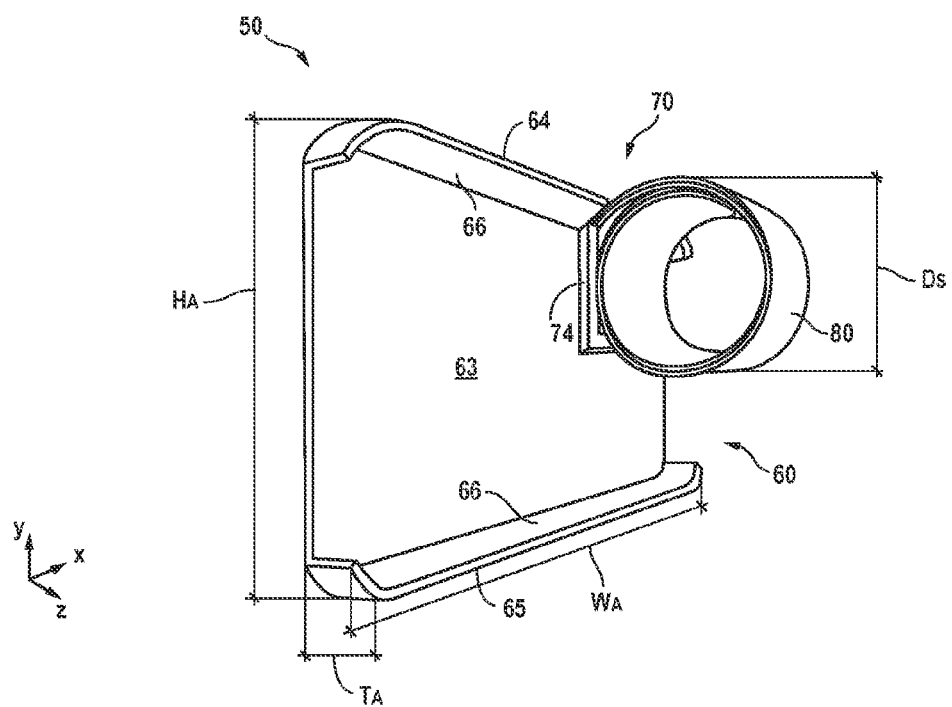

FIG. 2I shows a perspective view of the message board 50 from a perspective showing the side and back side 63 of the message board 50. The opening 70 is formed in the top side 64, comprising a rectangular and has received the coiled spring 80 within the inner area 71 and the attachment area 72, being held in place by the raised lip 74. When the message board 50 is arranged as shown in FIG. 2I, the message 56 can be limited to being displayed on the front side 62 of the attachment piece 60, which is obscured from view in the view presented in FIG. 2I.

As shown in FIG. 2I, the coiled spring 80 can comprise a first end 82 that can directly contact, or be coupled to, the back side 63 of the attachment piece 60. The coiled spring 80 can further comprise a second end 84 opposite the first end 82 that is wound along the length Ls of the coiled spring 80 to form the coiled portion 86. The coiled portion 86 can comprise a circular shape and a diameter of Ds, the coiled portion comprising concentric circles or overlapping portions of the coiled spring 80 with the top surface 85a of the coiled spring 80 being oriented towards, or contacting, a bottom surface 85b of the coiled spring 80. As non-limiting examples, the diameter Ds of the coiled spring 80 can comprise a distance in a range of about 2.5-12.7 cm (or 1.5-5 inches (in.)), 5.1-10.2 cm (or 2-4 in.), or about 6.4 cm (or 2.5 in.), wherein about, as used herein, can be equal to plus or minus 2.5 cm (or 1 in.) or less. In some instances, the coiled spring 80 can be arranged with the coiled portion 86 in a relaxed state adjacent the attachment piece 60 and comprise a diameter Ds that is greater than or equal to half the height Ha of the attachment piece 60. Alternatively, the diameter Ds can be less than or equal to half the height Ha of the attachment piece 60. A plane comprising a circular cross-section of the coiled portion 86 of the coiled spring 80 can be perpendicular to the width Wa or the height Ha of the attachment piece 60.

The length Ls of the coiled spring 80 from the second end 84 to the first end 82 can be coiled inwardly toward the attachment piece 60. The coiled spring 80 can be disposed behind, substantially behind, within a footprint of, or substantially within a footprint of the attachment piece 60. As such, the coiled portion 86 of the coiled spring 80 can be substantially aligned with, or covered by, the attachment piece 60 when viewed from the z-direction or from a position perpendicular to the height Ha and the width Wa of the attachment piece 60. When the message 56 is displayed on the front side 62 of the attachment piece 60, the coiled portion 86 of the coiled spring 80 can be substantially aligned with, or covered by, the message 56. As used herein, the covering of a substantial portion of the coiled spring 80 with respect to the attachment piece 60 or the message 56 can refer to percentage of the coiled spring 80 being covered by the attachment piece 60, such as by 50 percent or more, 60 percent or more, 70 percent or more, 80 percent or more, 90 percent or more, or 95 percent or more.

The first end 82 of the coiled spring 80 can be held in place against the attachment piece 60 and within the opening 70, the inner area 71, and the attachment area 72, by the raised lip 74. As indicated above, the lip 74 can comprise a number or various configurations, arrangements, or designs, as discussed above. The raised lip 74 can comprise one or more side portions 73, which can contact one or more portions of the coiled spring 80, such as the side edges 90 of the coiled spring 80.

Figure 2J:
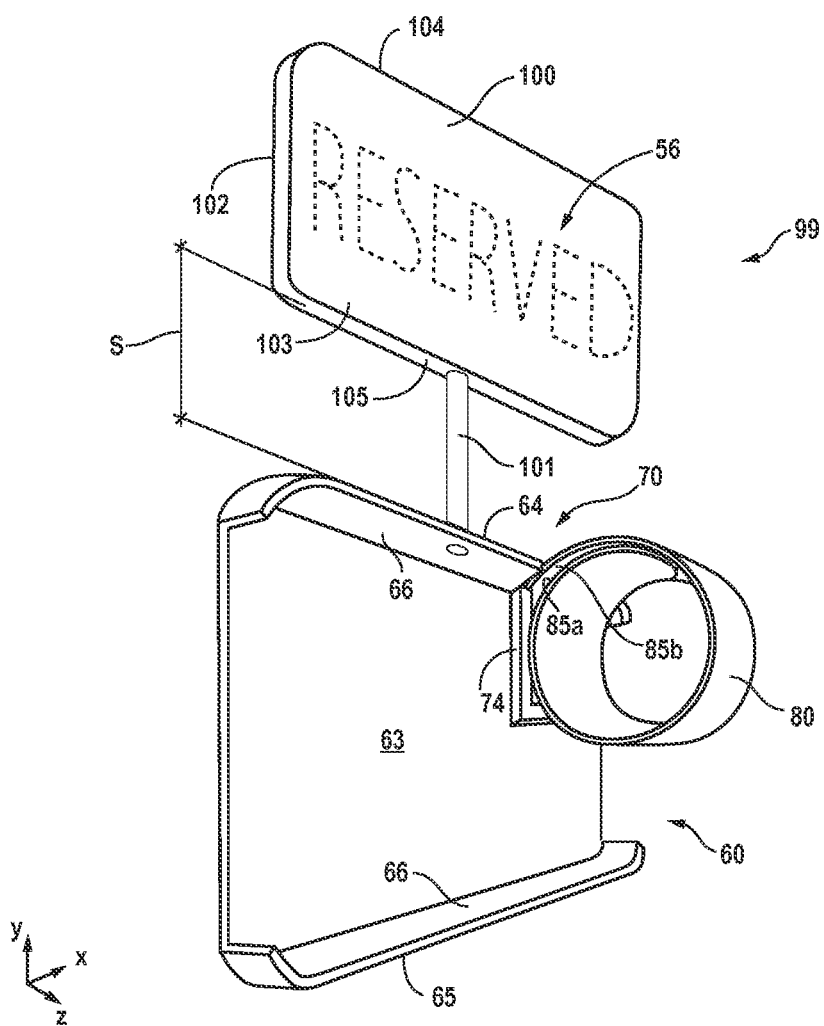

FIG. 2J shows another embodiment of a message board 50 in which a message 56 can be displayed on a placard 100 that is separate and distinct from the attachment piece 60. Placement of the message 56 on the placard 100 can be instead of, or in addition to, displaying the message 56 on the front side 62 of the attachment piece 60. As shown in FIG. 2J, the placard 100 can be coupled to the attachment piece 60 with a connecting member or antenna 101. The placard 100, like the attachment piece 60, can comprise a front side 102, a back side 103, a top side of the placard 104, and a bottom side of the placard 105. The placard 100 can be made of materials and with dimensions that are similar or identical to those of the attachment piece 60, or within ranges of dimensions that are suitable for the attachment piece 60. As such, the placard 100 can comprise the same size or the same area as the attachment piece 60. In other embodiments, the placard 100 can comprise a size or area that is greater than or less than the attachment piece 60.

In some instances, the placard 100 can comprise multiple messages 56, or the same message 56, disposed on both the front side 102 and the back side 103 of the placard to be viewed by interested or passing parties. Multiple messages 56, including two or more messages, three messages, four messages, or any desired number of messages, can be viewed on multiple faces or areas of the placard 100. The multiple messages 56 can be viewable from multiple directions without being blocked by the chair 52, to which the placard 100 is coupled, because the placard 100 can be disposed above the chair 52, due to the separation between the attachment piece 60 and the placard 100 provided by the connecting member 101.

The connecting member 101 can comprise any suitable material or combination of materials, including metal, plastic, resin, polymer, acrylic, ceramic, stone, fiber, or cellulose material such as paper, cardboard or wood. As such, the connecting member 101 can comprise, without limitation, silicone, PC, PE, PET, PVC, VN, or other suitable material. The connecting member 101 can be coupled to one or more of the attachment piece 60 and the placard 100 using any suitable chemical or mechanical fastener or attachment device or substance including without limitation, an adhesive, permanent adhesive, PSA, foam-core adhesive, tape, two-sided tape, mounting foam adhesive, fastener, clip, cleat, cutout, tab, snap, rivet, hog ring, or hook and loop fasteners. The connecting member 101 can provide a spacing, offset, or gap S between the attachment piece 60 and the placard 100, such as between the top side 64 and the bottom side 105. The spacing S can comprise a distance in a range of about 2.5-38 cm (or 1-15 in.), 3.8-20.3 cm (or 1.5-8 in.), or about 5.1-12.7 cm (or 2-5 in.), wherein about, as used herein, can be equal to plus or minus 2.5 cm (or 1 in.) or less.

Figure 3A:
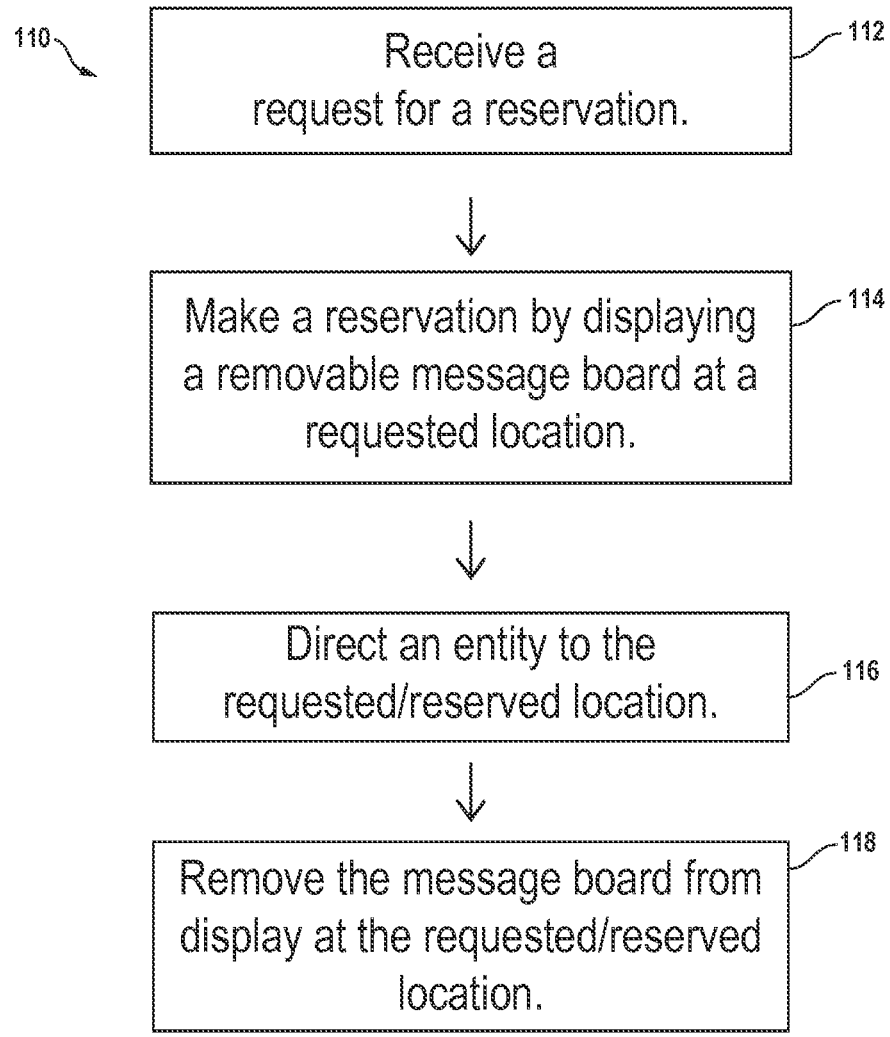
FIGS. 3A and 3B show flow charts of processes for using removable message boards.

FIG. 3A provides flow chart of a process 110 for a reservation system including a removable message board, such as message board 50. At block 112 a request for a reservation is received. From block 112, the process 110 continues at block 114 so that a reservation is made by displaying a removable message board at a requested location. From block 114, the process 110 continues at block 116 by directing an entity to the requested or reserved location. From block 116, the process 110 continues at block 118 by removing the message board from display at the requested or reserved location.

Figure 3B:
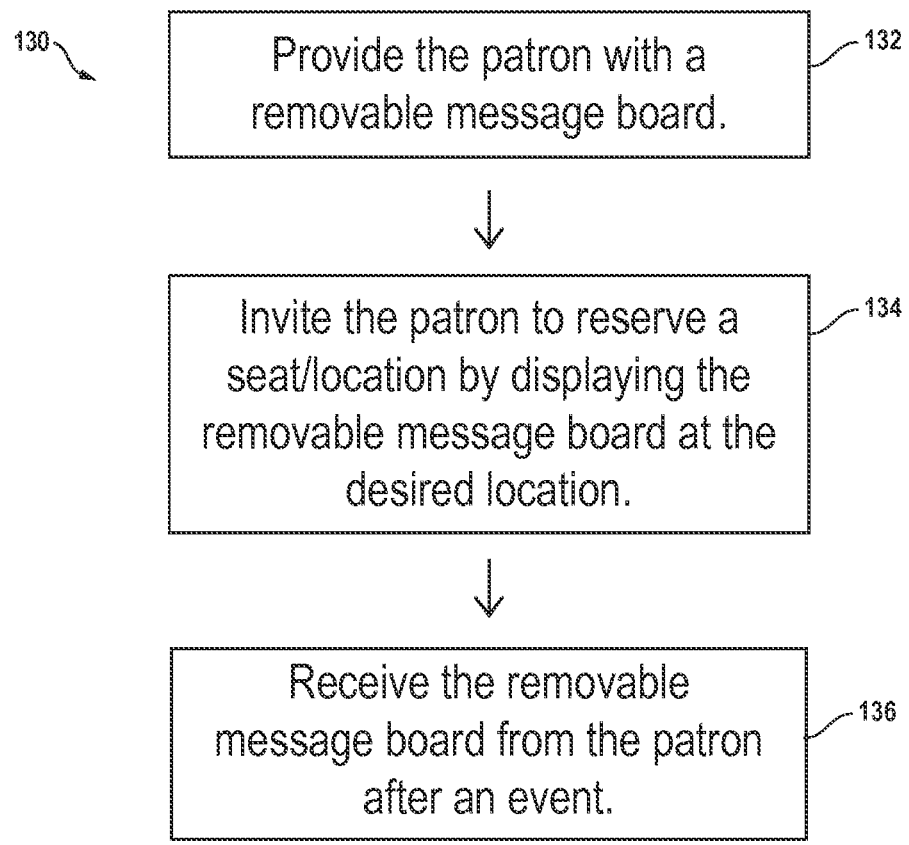

FIG. 3B provides flow chart of a process 130 for a reservation system including a removable message board, such as message board 50. At block 132 a patron is provided with a removable message board. From block 132, the process 130 continues at block 144 by inviting the patron to reserve a seat or location by displaying the removable message board at a desired location. From block 134, the process 130 continues at block 136 by receiving the removable message board from the patron after an event. In some instance, the message board 50 can be provided by at the venue or establishment the patron is attending for use at the venue, and then returned when the engagement is over. In other instances, a user can be an owner of the message board 50, and bring the message board with them to the venue, such as in a purse to a movie theater, and use the message board for reserving a seat without assistance or instruction from the venue being frequented.

Accordingly, the message board 50 disclosed herein provides a number of advantages for reservations and communication of messages, as well as a simple, robust, efficient, and convenient device for releasably coupling messages to a range of desired objects.

Where the above examples, embodiments and implementations reference examples, it should be understood by those of ordinary skill in the art that other devices and examples could be intermixed or substituted with those provided as virtually any components consistent with the intended operation of a method, system, or implementation may be utilized. Accordingly, for example, although particular component examples may be disclosed, such components may be comprised of any shape, size, style, type, model, version, class, grade, measurement, concentration, material, weight, quantity, and/or the like consistent with the intended purpose, method and/or system of implementation. In places where the description above refers to particular embodiments, it should be readily apparent that a number of modifications may be made without departing from the spirit thereof and that these embodiments and implementations may be applied to other embodiments as well. Accordingly, the disclosed subject matter is intended to embrace all such alterations, modifications, and variations that fall within the spirit and scope of the disclosure and the knowledge of one of ordinary skill in the art. The presently disclosed embodiments are, therefore, to be considered in all respects as illustrative and not restrictive.

What is claimed is:

1. A removable message board, comprising:
   an attachment piece comprising a front side and a back side opposite the front side;
   a message displayed on the front side of the attachment piece; and
   a coiled spring comprising a first end that directly contacts the back side of the attachment piece and a second end opposite the first end that is wound along a length of the coiled spring to form a concentric circular shape configured to press against a chair back, wherein a plane comprising a circular cross-section of the coiled spring is perpendicular to a length and a height of the attachment piece;
   wherein the coiled spring is disposed behind the attachment piece such that the coiled spring is substantially covered by the attachment piece when viewed from a position perpendicular to a length and width of the attachment piece.

2. The removable message board of claim 1, wherein a first end of the coiled spring is held in place against the attachment piece by a raised lip that contacts at least two edges of the coiled spring.

3. The removable message board of claim 1, wherein the coiled spring is substantially covered by the attachment piece when 50% or more of the coiled spring is covered by the attachment piece when viewed from the position perpendicular to the length and width of the attachment piece.

4. The removable message board of claim 1, wherein a length of the coiled spring from the second end to the first end is coiled inwardly toward the attachment piece in concentric circles such that a top surface of the coiled spring is oriented towards a bottom surface of the coiled spring that is formed opposite the top surface.

5. The removable message board of claim 4, wherein the coiled spring is configured to place an object disposed between the attachment piece and the coiled spring in compression without the use of a scissor clamp, and without the length of the coiled spring comprising a crossed portion along its length.

6. A method of using the removable message board of claim 4, comprising:
moving a portion of the coiled spring away from the attachment piece while the first end of the coiled spring remains in contact with the back side of the of the attachment piece to create a gap between the portion of the coiled spring comprising the second end of the coiled spring and the attachment piece;
disposing an object within the gap between the attachment piece and the portion of the coiled spring; and
releasing the coiled spring so that the coiled spring moves towards the attachment piece to decrease a size of the gap such that the portion of the coiled spring contacts the object to removably couple the removable message board to the object.

7. A removable message board, comprising:
an attachment piece comprising a front side and a back side opposite the front side;
a message coupled to the attachment piece; and
a single coiled spring comprising a first end coupled to the back side of the attachment piece and a second end opposite the first end that is wound along a length of the coiled spring to form a circular shape, wherein a length of the coiled spring from the second end to the first end is coiled inwardly toward the attachment piece in concentric circles such that a top surface of the coiled spring is oriented towards a bottom surface of the coiled spring that is formed opposite the top surface;
wherein the coiled spring is disposed behind the attachment piece such that the coiled spring is substantially covered by the attachment piece when viewed from a position perpendicular to a length and width of the attachment piece.

8. The removable message board of claim 7, wherein a first end of the coiled spring is held in place against the attachment piece by a raised lip.

9. The removable message board of claim 7, wherein the coiled spring is substantially covered by the attachment piece when 50% or more of the coiled spring is covered by the attachment piece when viewed from the position perpendicular to the length and width of the attachment piece.

10. The removable message board of claim 7, wherein the coiled spring is configured to place an object disposed between the attachment piece and the coiled spring in compression without the use of a scissor clamp, and without the length of the coiled spring comprising a crossed portion along its length.

11. The removable message board of claim 7, wherein the message is disposed on a placard that is coupled to, and spaced away from, the attachment piece by a connecting member.

12. The removable message board of claim 7, wherein the single coiled spring is configured to receive an object in a gap G between the attachment piece and the single coiled spring.

13. A removable message board, comprising:
an attachment piece comprising a front side and a back side opposite the front side;
a message coupled to the attachment piece; and
a coiled spring comprising a first end coupled to the back side of the attachment piece and a second end opposite the first end that is wound along a length of the coiled spring to form a concentric circular shape, wherein a plane comprising a circular cross-section of concentric portions of the coiled spring is perpendicular to a length and a height of the attachment piece, and wherein the first end of the coiled spring is held in place against the attachment piece by a raised lip that contacts at least two edges of the coiled spring.

14. The removable message board of claim 13, further comprising the coiled spring being disposed behind the attachment piece such that the coiled spring is substantially covered by the attachment piece when viewed from a position perpendicular to a length and width of the attachment piece, and wherein the coiled spring is substantially covered by the attachment piece when 50% or more of the coiled spring is covered by the attachment piece.

15. The removable message board of claim 13, wherein a length of the coiled spring from the second end to the first end is coiled inwardly toward the attachment piece such that a top surface of the coiled spring is oriented towards a bottom surface of the coiled spring that is formed opposite the top surface.

16. The removable message board of claim 15, wherein the coiled spring is configured to place an object disposed between the attachment piece and the coiled spring in compression without the use of a scissor clamp, and without the length of the coiled spring comprising a crossed portion along its length.

17. The removable message board of claim 13, wherein the message is disposed on a placard that is coupled to, and spaced away from, the attachment piece by a connecting member.

* * * * *